（12）United States Patent
Murakami et al.

(10) Patent No.: US 10,712,041 B2
(45) Date of Patent: Jul. 14, 2020

(54) COOLING FAN AUTOMATIC CONTROL SYSTEM AND COOLING FAN AUTOMATIC CONTROL DEVICE

(71) Applicant: SANYO DENKI CO., LTD., Tokyo (JP)

(72) Inventors: Naoki Murakami, Tokyo (JP); Masashi Murakami, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 18 days.

(21) Appl. No.: 16/006,391

(22) Filed: Jun. 12, 2018

(65) Prior Publication Data
US 2018/0363938 A1 Dec. 20, 2018

(30) Foreign Application Priority Data

Jun. 15, 2017 (JP) ................................. 2017-117488

(51) Int. Cl.
F24F 11/77 (2018.01)
F24F 11/76 (2018.01)
G05B 19/042 (2006.01)
F24F 11/64 (2018.01)
F24F 110/10 (2018.01)
F24F 140/60 (2018.01)

(52) U.S. Cl.
CPC .............. F24F 11/77 (2018.01); F24F 11/64 (2018.01); F24F 11/76 (2018.01); G05B 19/042 (2013.01); F24F 2110/10 (2018.01); F24F 2140/60 (2018.01); G05B 2219/2614 (2013.01)

(58) Field of Classification Search
None
See application file for complete search history.

(56) References Cited

U.S. PATENT DOCUMENTS 7,483,270 B2 * 1/2009 Blake .................... F04D 27/004
361/679.48
8,374,725 B1 * 2/2013 Ols ...................... F24F 13/1426
700/277
9,534,797 B2 * 1/2017 Tsutsumi .............. F24F 3/0442
(Continued)

FOREIGN PATENT DOCUMENTS

EP 2226507 A1 9/2010
EP 2813776 A1 12/2014
JP 2016211762 12/2016

OTHER PUBLICATIONS

Formal Examination Report dated Jan. 16, 2019 for the corresponding Philippine Patent Application No. 1-2018-000167.
(Continued)

Primary Examiner — Ramesh B Patel
(74) Attorney, Agent, or Firm — Rankin, Hill & Clark LLP

(57) ABSTRACT

A cooling fan automatic control system includes: a temperature sensor configured to measure a temperature of an object to be cooled; a plurality of current sensors configured to measure power consumption by each of a plurality of cooling fans; and a controller which, when a measured temperature that is a measured value obtained by the temperature sensor is higher than a target cooling temperature of the object to be cooled, controls rotational speeds of the plurality of cooling fans so as to minimize a total of measured current values of the plurality of cooling fans obtained by the plurality of current sensors.

10 Claims, 4 Drawing Sheets

(56) References Cited

U.S. PATENT DOCUMENTS

| | | | |
|---|---|---|---|
| 9,785,208 B2* | 10/2017 | Lovicott | G06F 1/206 |
| 10,101,049 B2* | 10/2018 | Sondur | F24F 11/30 |
| 2002/0017483 A1 | 2/2002 | Chesner | |
| 2002/0020755 A1* | 2/2002 | Matsushita | G06F 1/206 236/49.3 |
| 2007/0289322 A1 | 12/2007 | Mathews | |
| 2008/0232974 A1* | 9/2008 | Tsuchiya | G06F 1/20 417/14 |
| 2009/0092262 A1* | 4/2009 | Costa | G06F 1/20 381/71.1 |
| 2010/0163633 A1* | 7/2010 | Barrett | F24F 13/082 236/49.3 |
| 2010/0260616 A1 | 10/2010 | Osawa | |
| 2014/0150480 A1* | 6/2014 | Kodama | H05K 7/20209 62/89 |
| 2014/0165636 A1* | 6/2014 | Zhang | F24F 11/30 62/186 |
| 2014/0222241 A1* | 8/2014 | Ols | G05B 15/02 700/299 |
| 2014/0316581 A1 | 10/2014 | Fadell | |
| 2014/0323030 A1* | 10/2014 | Rugge | F24F 11/74 454/256 |
| 2016/0054046 A1 | 2/2016 | Sim | |
| 2016/0274629 A1* | 9/2016 | Lovicott | G06F 1/206 |
| 2017/0184322 A1* | 6/2017 | Lee | G09G 5/02 |
| 2018/0045424 A1 | 2/2018 | Yajima et al. | |
| 2018/0058463 A1* | 3/2018 | Rollins | F04D 25/0606 |

OTHER PUBLICATIONS

European Search Report dated Nov. 19, 2018 for the corresponding European Patent Application No. 18177429.0.

* cited by examiner

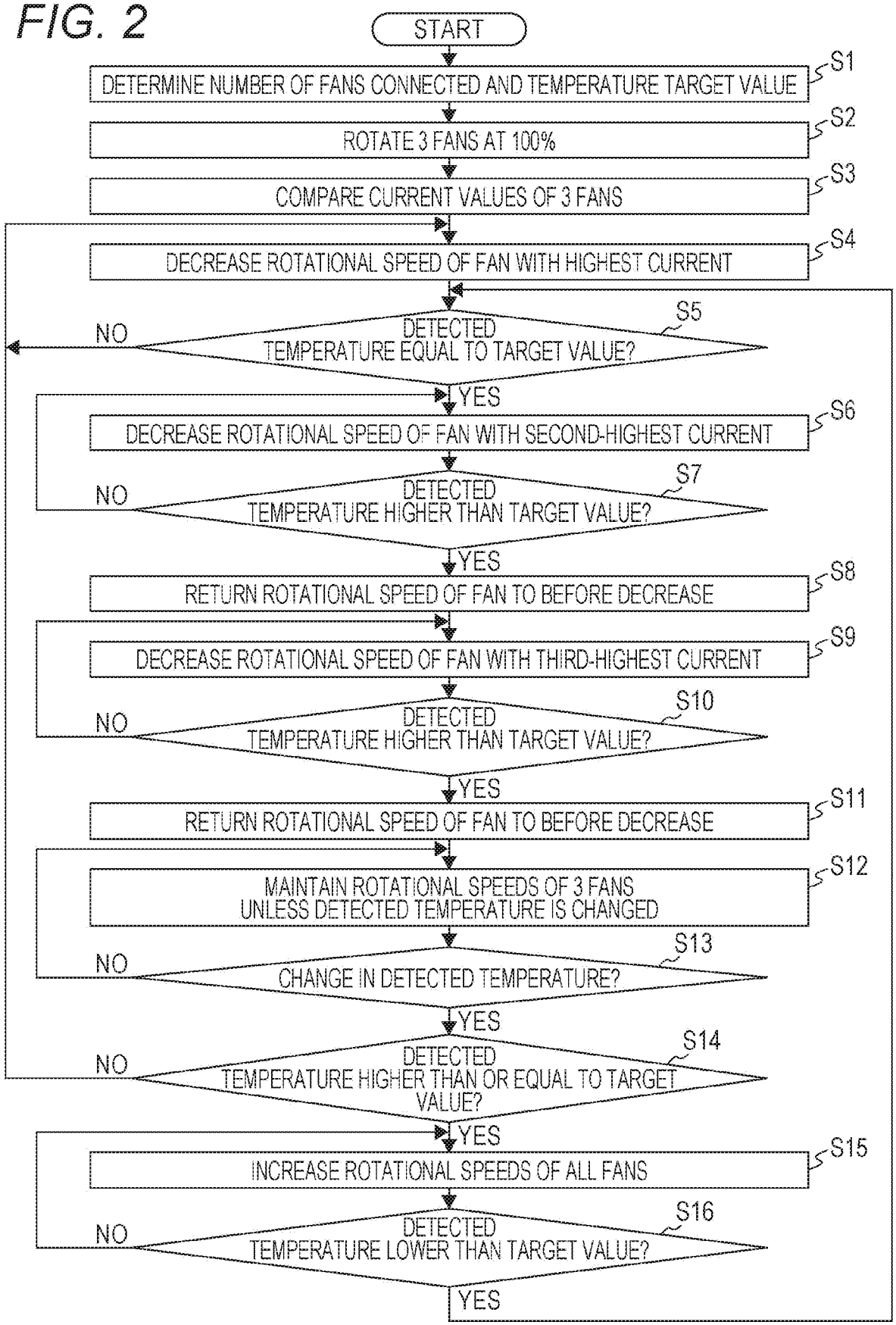

COOLING FAN AUTOMATIC CONTROL SYSTEM AND COOLING FAN AUTOMATIC CONTROL DEVICE

CROSS-REFERENCE TO RELATED APPLICATION

This application claims priority from Japanese Patent Application No. 2017-117488 filed with the Japan Patent Office on Jun. 15, 2017, the entire content of which is hereby incorporated by reference.

BACKGROUND

1. Technical Field

The present disclosure relates to a cooling fan automatic control system and a cooling fan automatic control device.

2. Related Art

Concerning a cooling fan automatic control technique for automatically controlling a plurality of fans, systems in which a plurality of fans is used have been proposed. For example, JP-A-2016-211762 describes an air-conditioning and ventilation system which includes an air-conditioning device, a ventilation device, an air-conditioning control unit, and a ventilation control unit. The air-conditioning device includes an outdoor unit and an indoor unit. The indoor unit is provided in a refrigerant circuit (RC) together with the outdoor unit, and is installed in a target space (SP). During operation, the air-conditioning device causes refrigerant to circulate through the refrigerant circuit in order to perform cooling or heating in the target space. The ventilation device includes ventilation fans for ventilation, and is installed in the target space. The air-conditioning control unit controls the operation of the air-conditioning device. The ventilation control unit is electrically connected to the ventilation device, and controls the operation of the ventilation device. When the ventilation control unit is enabled to control the operation of the ventilation device, the ventilation control unit transmits a notification signal to the air-conditioning control unit. Unless the air-conditioning control unit receives the notification signal, the air-conditioning control unit does not start the operation of the air-conditioning device.

SUMMARY

A cooling fan automatic control system includes: a temperature sensor configured to measure a temperature of an object to be cooled; a plurality of current sensors configured to measure power consumption by each of a plurality of cooling fans; and a controller which, when a measured temperature that is a measured value obtained by the temperature sensor is higher than a target cooling temperature of the object to be cooled, controls rotational speeds of the plurality of cooling fans so as to minimize a total of measured current values of the plurality of cooling fans obtained by the plurality of current sensors.

BRIEF DESCRIPTION OF THE DRAWINGS

FIG. 2 is a flowchart illustrating the flow of processing performed by fan control software, also illustrating an example of processing for controlling the rotational speeds of fans in order from a fan with a higher current value.

DESCRIPTION OF EMBODIMENTS

Figure 1A:
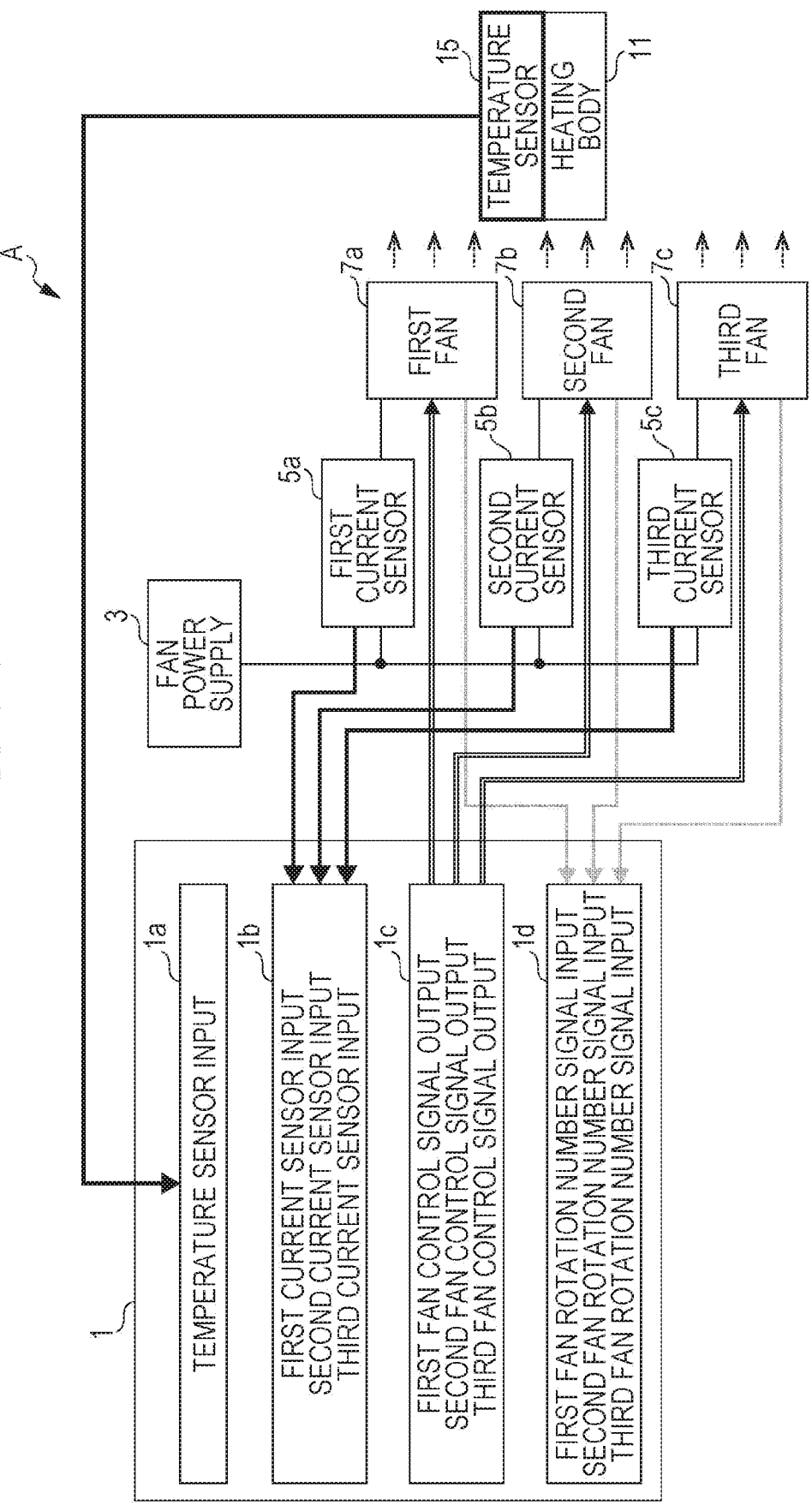
FIG. 1A is a functional block diagram illustrating a configuration example of a cooling fan automatic control system according to a first embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

When a plurality of fans is used for cooling, for example, wasteful electric power may be consumed by a suboptimal combination of the rotational speeds of the fans.

An objective of an embodiment of the present disclosure is to provide a technique for automatically controlling, when a plurality of fans is used for cooling, the cooling fans in such a way as to minimize overall power consumption.

A cooling fan automatic control system according to an aspect of the present disclosure is provided, including: a temperature sensor configured to measure a temperature of an object to be cooled; a plurality of current sensors configured to measure power consumption by each of a plurality of cooling fans; and a controller which, when a measured temperature that is a measured value obtained by the temperature sensor is higher than a target cooling temperature of the object to be cooled, controls rotational speeds of the plurality of cooling fans so as to minimize a total of measured current values of the plurality of cooling fans obtained by the plurality of current sensors.

The controller controls the plurality of cooling fans so as to decrease the rotational speeds in order from a cooling fan of which the measured current value is higher. The controller controls the plurality of cooling fans so as to decrease the rotational speeds of the plurality of cooling fans in a pre-set order.

The cooling fan automatic control system preferably further includes a storage unit configured to store, for each target cooling temperature, such a combination of the rotational speeds of the plurality of cooling fans as to minimize the total of the measured current values obtained by the plurality of current sensors. The controller preferably controls the rotational speeds of the plurality of cooling fans so as to be equal to the rotational speeds of the plurality of cooling fans stored in the storage unit.

In addition, an embodiment of the present disclosure is a cooling fan automatic control device, including a controller configured to control, when a measured temperature of an object to be cooled is higher than a target cooling temperature, rotational speeds of a plurality of cooling fans so as to minimize a total of power consumption by each of the plurality of cooling fans.

According to an embodiment of the present disclosure, it becomes possible to reduce power consumption when an object to be cooled is cooled using a plurality of fans.

In the following, a cooling fan automatic control technique according to embodiments of the present disclosure will be described with reference to the drawings.

First Embodiment

Figure 1B:
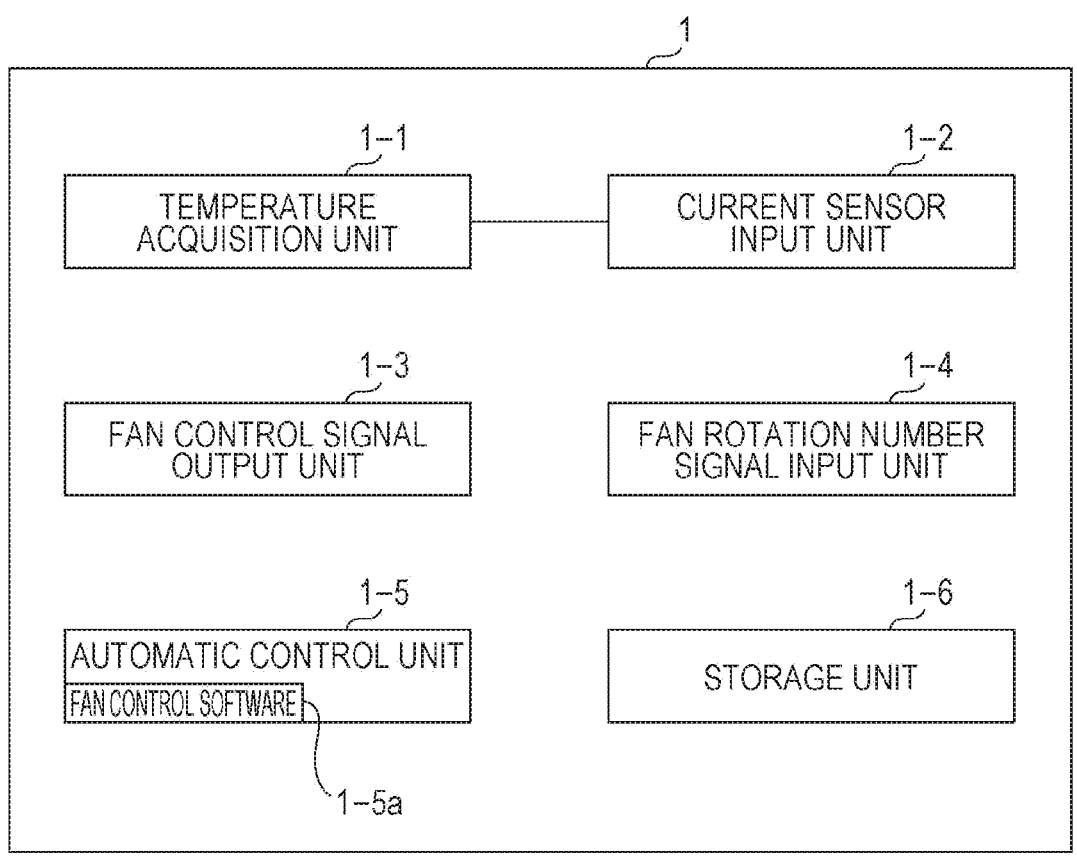
FIG. 1B is a functional block diagram illustrating a configuration example of a control function unit.

FIG. 1A is a functional block diagram illustrating a configuration example of a cooling fan automatic control system according to a first embodiment of the present disclosure. In the present example, three cooling fans are used. The embodiment, however, is not intended to limit the number of cooling fans. FIG. 1B is a functional block diagram illustrating a configuration example of a control function unit.

As illustrated in FIG. 1A, the cooling fan automatic control system A according to the present embodiment includes a temperature sensor 15, a plurality of current sensors 5a, 5b, 5c, and a controller 1. The temperature sensor 15 measures the temperature of a heating body 11 which is the object to be cooled. While in the present embodiment the plurality of current sensors includes the three current sensors 5a, 5b, 5c, this is not intended to be limiting. Thus, the plurality of current sensors may be denoted as a plurality of current sensors 5a, 5b, 5c, . . . . The plurality of current sensors 5a, 5b, 5c measures power consumption by each of a plurality of cooling fans 7a, 7b, 7c, which may include, or may be connected to, a fan power supply 3. The number of the cooling fans is not limited to three; thus, the plurality of cooling fans may be denoted as a plurality of cooling fans 7a, 7b, 7c, . . . . When a measured temperature is higher than a target cooling temperature of the object to be cooled, the controller 1 controls the rotational speeds of the plurality of cooling fans 7a, 7b, 7c so as to minimize the total of measured current values of the plurality of cooling fans 7a, 7b, 7c obtained by the plurality of current sensors 5a, 5b, 5c. The measured temperature is a measured value obtained by the temperature sensor 15.

The controller 1 includes a temperature sensor input 1a, a current sensor input 1b, a fan control signal output 1c, and a fan rotation number signal input 1d.

In addition, the controller 1 includes control function units illustrated in FIG. 1B. The control function units include a temperature acquisition unit 1-1, a current sensor input unit 1-2, a fan control signal output unit 1-3, a fan rotation number signal input unit 1-4, an automatic control unit 1-5, and a storage unit 1-6. In the automatic control unit 1-5, fan control software 1-5a and the like are stored.

FIG. 2 is a flowchart illustrating the flow of a control process performed by the fan control software 1-5a. FIG. 2 also illustrates an example of processing for controlling the rotational speeds of the fans in order from a fan using the highest current value the fan to which the highest current is applied). In the illustrated example, three cooling fans are provided.

As illustrated in FIG. 2, as the process is started (Start), the number of cooling fans connected and a temperature target value are determined in step S1. In step S2, the three cooling fans are rotated at 100% output (capacity).

In step S3, the current values of the three cooling fans are compared. In step S4, the rotational speed of the cooling fan to which the highest current is applied (a fan using the highest current value; a first cooling fan) is decreased. In step S5, it is determined whether a detected temperature (measured temperature) is equal to the target value. The target value is a target cooling temperature of the object to be cooled. If the result of determination in step 5 is No, the process returns to step S4. If the result of determination in step 5 is Yes, the process proceeds to step SC. In step 6, the rotational speed of the cooling fan to which the second-highest current is applied (a second cooling fan) is decreased. In step S7, it is determined whether the detected temperature is higher than the target value. If the result of determination in step S7 is No, the process returns to step S6. If the result of determination in step S7 is Yes, the process proceeds to step S8. In step 8, the rotational speed of the second cooling fan is returned to the rotational speed thereof before the decrease.

In step S9, the rotational speed of the cooling fan to which the third-highest current is applied (a third cooling fan) is decreased. In step S10, it is determined whether the detected temperature is higher than the target value. If the result of determination in step S10 is No, the process returns to step S9.

If the result of determination in step S10 is Yes, the rotational speed of the third cooling fan is returned, in step S11, to the rotational speed thereof before the decrease. In step S12, unless the detected temperature changes, the respective rotational speeds of the three cooling fans are maintained. In step S13, it is determined whether the detected temperature has changed. If the result of determination in step S13 is No, the process returns to step S12.

If the result of determination in step S13 is Yes, it is determined in step S14 whether the detected temperature is greater than or equal to the target value. If the result of determination in step S14 is No, the process returns to step S4. If the result of determination in step S14 is Yes, the process proceeds to step S15. In step 15, the rotational speeds of all of the cooling fans are increased. In step S16, it is determined whether the detected temperature is lower than the target value. If the result of determination in step S16 is No, the process returns to step S15. If the result of determination in step S16 is Yes, the process returns to step S5.

As described above, when the measured temperature is higher than the target cooling temperature of the object to be cooled (heating body) 11, the rotational speeds of the plurality of cooling fans 7a, 7b, 7c are controlled so as to minimize the total of the measured current values of the plurality of cooling fans 7a, 7b, 7c obtained by the plurality of current sensors 5a, 5b, 5c. The measured temperature is the measured value obtained by the temperature sensor 15. Through the above-described process, it becomes possible, when a plurality of cooling fans is used, to automatically control the cooling fans so as to minimize their overall power consumption.

Second Embodiment

Figure 3:
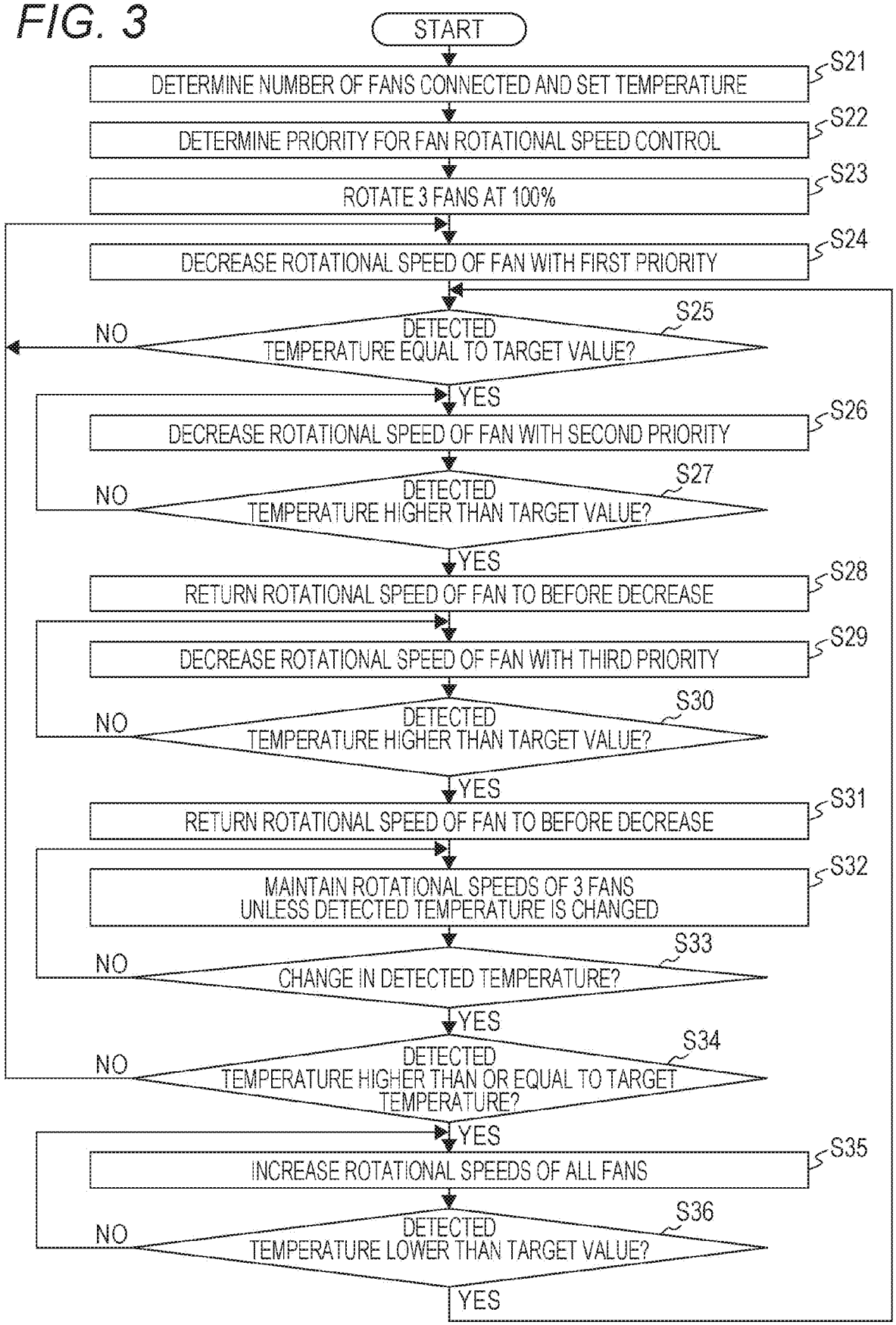
FIG. 3 is a flowchart illustrating the flow of processing performed by fan control software 1-5a according to a second embodiment of the present disclosure, also illustrating an example of processing for controlling the rotational speeds of fans in order from a fan with higher priority.

A second embodiment of the present disclosure will be described. FIG. 3 is a flowchart of the flow of processing performed by the fan control software 1-5a according to the present embodiment. Specifically, FIG. 3 illustrates a processing example of rotational speed control performed in order from a fan with higher priority. In the present example, three cooling fans are provided, and the rotational speeds of the cooling fans are controlled, the cooling fans having been prioritized.

As illustrated in FIG. 3, as the process is started (Start), the number of cooling fans connected and a set temperature are determined in step S21. In step S22, the order (priority) in which the rotational speeds of the cooling fans are to be controlled is determined. In step S23, the three cooling fans are rotated at 100% output. In step S24, the rotational speed of the cooling fan of the first order (priority) is decreased. In step S25, it is determined whether the detected temperature is equal to the target value. If the result of determination in step S25 is No, the process returns to step S24. If the result of determination in step S25 is Yes, the process proceeds to step S26. In step S26, the rotational speed of the cooling fan of the second order (priority) is decreased. In step S27, it is determined whether the detected temperature is higher than the target value. If the result of determination in step S27 is No, the process returns to step S26. If the result of determination in step S27 is Yes, the process proceeds to step S28. In step S28, the rotational speed of the cooling fan of the second priority is returned to the rotational speed thereof before the decrease.

In step S29, the rotational speed of the cooling fan of the third order (priority) is decreased. In step S30, it is determined whether the detected temperature is higher than the target value. If the result of determination in step S30 is No, the process returns to step S29. If the result of determination in step S30 is Yes, the process proceeds to step S31. In step S31, the rotational speed of the cooling fan of the third priority is returned to the rotational speed thereof before the decrease. In step S32, unless the detected temperature changes, the respective rotational speeds of the three cooling fans are maintained. In step S33, upon detection of a change in the detected temperature, the process proceeds to step S34. In step S34, it is determined whether the detected temperature is greater than or equal to the target value. If the result of determination in step S34 is No, the process returns to step S24. If the result of determination in step S34 is Yes, the process proceeds to step S35. In step S35, the rotational speeds of all of the cooling fans are increased.

In step S36, it is determined whether the detected temperature is lower than the target value. If the result of determination in step S36 is No, the process returns to step S35. If the result of determination in step S36 is Yes, the process returns to step S25.

Through the above-described process, it becomes possible, when a plurality of cooling fans is used, to automatically control the cooling fans so as to minimize their overall power consumption.

Third Embodiment

A third embodiment of the present disclosure will be described. In the present embodiment, such combinations of the rotational speeds of the three cooling fans as to minimize current values are stored in the automatic control unit 1-5 for each set temperature. Then, in a subsequent process, the rotational speeds of the three cooling fans are controlled to be equal to the stored rotational speeds.

In this way, as long as the same system is used, it becomes possible to control the rotational speeds (numbers of rotations) of the cooling fans and to quickly achieve optimum rotational speeds without the process of trial and error as performed in the first embodiment or the second embodiment.

In addition, by starting the process of the first embodiment or the second embodiment from the stored rotational speeds, it becomes possible to determine appropriate rotational speeds more quickly.

The foregoing embodiments are not limited to the configurations and the like illustrated in the attached drawings. The present embodiments may be modified, as appropriate, as long as the effects of the present disclosure can be obtained. The embodiments may be implemented with appropriate modifications without departing from the scope of the objects of the present disclosure.

The constituent elements of the embodiments of the present disclosure may be optionally selected, as appropriate. An invention with an optionally selected configuration is also included in the embodiments of the present disclosure.

The embodiments of the present disclosure may include first through fourth cooling fan automatic control systems, and a first cooling fan automatic control device.

The first cooling fan automatic control system includes a temperature sensor for measuring a temperature of an object to be cooled; a plurality of current sensors for measuring power consumption by each of a plurality of cooling fans; and a controller which, when a measured temperature that is a measured value from the temperature sensor is higher than a target cooling temperature of the object to be cooled, controls rotational speeds of the plurality of cooling fans so as to minimize a total of measured current values from the plurality of current sensors.

The second cooling fan automatic control system is the first cooling fan automatic control system, wherein the controller implements control to decrease numbers of rotations in order from a cooling fan of which the measured current value is higher.

The third cooling fan automatic control system is the first cooling fan automatic control system, wherein the controller implements control to decrease the numbers of rotations of the cooling fans in a pre-set order for decreasing the numbers of rotations.

The fourth cooling fan automatic control system is the first cooling fan automatic control system, further including a storage unit for storing, for each target cooling temperature, such a combination of the rotational speeds as to minimize the total of the current values from the current sensors, wherein the controller controls the cooling fans so as to achieve the numbers of rotations of the cooling fans stored in the storage unit.

The first cooling fan automatic control device includes a controller which, when a measured temperature of an object to be cooled is higher than a target cooling temperature, controls rotational speeds of a plurality of cooling fans so as to minimize a total of power consumption by each of the plurality of cooling fans.

INDUSTRIAL APPLICABILITY

The present disclosure may be utilized for a cooling fan automatic control system.

The foregoing detailed description has been presented for the purposes of illustration d description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. A cooling fan automatic control system comprising:
a plurality of cooling fans configured to cool a heating body;
a temperature sensor configured to measure a temperature of the heating body;

a plurality of current sensors configured to measure electrical values of current of each of the plurality of cooling fans; and a controller which controls, based on the electrical values of current of each of the plurality of cooling fans obtained by the plurality of current sensors and a measured temperature of the heating body that is a measured value obtained by the temperature sensor, rotational speeds of the plurality of cooling fans so as to reduce a total of measured electrical values of current of the plurality of cooling fans obtained by the plurality of current sensors.

2. The cooling fan automatic control system according to claim 1, wherein the controller controls the plurality of cooling fans so as to decrease the rotational speeds in order from a cooling fan of which the measured electrical value of current is higher.

3. The cooling fan automatic control system according to claim 2, wherein the controller is further configured to control the rotational speed of each of the cooling fans, the rotational speed of which has been decreased in response to the measured temperature of the heating body which is equal to or higher than the target cooling temperature, so as to be returned to a rotational speed before being decreased.

4. The cooling fan automatic control system according to claim 1, wherein the controller controls the plurality of cooling fans so as to decrease the rotational speeds of the plurality of cooling fans in a pre-set order.

5. The cooling fan automatic control system according to claim 4, wherein the pre-set order is determined based on priorities of each of the plurality of cooling fans.

6. The cooling fan automatic control system according to claim 1, further comprising a storage unit configured to store, for each target cooling temperature of the heating body, such a combination of the rotational speeds of the plurality of cooling fans as to reduce the total of the measured electrical values of current obtained by the plurality of current sensors, wherein the controller controls the rotational speeds of the plurality of cooling fans so as to be equal to the rotational speeds of the plurality of cooling fans stored in the storage unit.

7. The cooling fan automatic control system according to claim 1, wherein the controller compares the measured electrical values of current of the plurality of cooling fans each other and controls the plurality of cooling fans so as to decrease the rotational speeds in order from a cooling fan of which the measured electrical value of current is higher.

8. The cooling fan automatic control system according to claim 1, wherein the measured temperature of the heating body is kept lower than a target cooling temperature of the heating body during a control operation for the rotational speeds of the plurality of cooling fans.

9. The cooling fan automatic control system according to claim 1, wherein the controller controls to:

decrease the rotational speed of one of the plurality of cooling fans to which a highest electrical value of current measured by the current sensor is applied; and after decreasing the rotational speed of the one of the plurality of cooling fans, when the measured temperature of the heating body is equal to a target cooling temperature of the heating body, decrease the rotational speed of another one of the plurality of cooling fans to which a second highest electrical value of current measured by the current sensor is applied.

10. The cooling fan automatic control system according to claim 9, wherein, after decreasing the rotational speed of the another one of the plurality of cooling fans, the controller controls to return the rotational speed of the another one of the plurality of cooling fans to the rotational speed before the rotational speed of the another one of the plurality of cooling fans is decreased, when the measured temperature of the heating body is higher than the target cooling temperature.

* * * * *